(12) United States Patent
Visenzi

(10) Patent No.: US 12,054,217 B2
(45) Date of Patent: Aug. 6, 2024

(54) LATERAL CASE FOR MOTORCYCLES WITH IMPROVED COUPLING DEVICE TO THE VEHICLE FRAME

(71) Applicant: GIVI S.P.A., Flero (IT)

(72) Inventor: Giuseppe Visenzi, Brescia (IT)

(73) Assignee: GIVI S.P.A., Flero (IT)

( * ) Notice: Subject to any disclaimer, the term of this patent is extended or adjusted under 35 U.S.C. 154(b) by 530 days.

(21) Appl. No.: 17/430,216

(22) PCT Filed: Feb. 10, 2020

(86) PCT No.: PCT/IB2020/051009
§ 371 (c)(1),
(2) Date: Aug. 11, 2021

(87) PCT Pub. No.: WO2020/165722
PCT Pub. Date: Aug. 20, 2020

(65) Prior Publication Data
US 2022/0161881 A1 May 26, 2022

(30) Foreign Application Priority Data

Feb. 15, 2019 (IT) .................... 102019000002225

(51) Int. Cl.
*B62J 9/23* (2020.01)
*B62J 9/27* (2020.01)
(Continued)

(52) U.S. Cl.
CPC . *B62J 9/23* (2020.02); *B62J 9/27* (2020.02); *B62J 9/30* (2020.02); *B62K 19/40* (2013.01)

(58) Field of Classification Search
CPC ....... B62J 9/23; B62J 9/27; B62J 9/30; B62K 19/40
See application file for complete search history.

(56) References Cited

U.S. PATENT DOCUMENTS 8,292,139 B2 * 10/2012 Golub ................ B62J 7/08
224/558
8,864,002 B2 * 10/2014 Iida .................... B62J 7/04
224/430
(Continued)

FOREIGN PATENT DOCUMENTS

CN 1198136 A 11/1998
CN 101311058 A 11/2008
(Continued)

OTHER PUBLICATIONS

Japanese Office Action and Search Report for Japanese Application No. 2021-532458, dated Oct. 18, 2023, 21 pages with translation.
(Continued)

*Primary Examiner* — Kevin Hurley
*Assistant Examiner* — Michael R Stabley
(74) *Attorney, Agent, or Firm* — CANTOR COLBURN LLP

(57) ABSTRACT

A lateral case for motorcycles provided with an improved coupling/release device for the coupling and release of the case itself to/from the vehicle frame is configured to allow the user to perform the coupling and release operations with a single and simple vertical movement of the bag with respect to the motorcycle frame, so that the coupling/release operation is simpler and more convenient for the user. Furthermore, the coupling/release device of the lateral case is easy for the user to activate and has a high degree of security towards accidental or fraudulent openings.

10 Claims, 9 Drawing Sheets

(51) Int. Cl.
*B62J 9/30* (2020.01)
*B62K 19/40* (2006.01)

(56) References Cited

U.S. PATENT DOCUMENTS

| | | | |
|---|---|---|---|
| 9,056,641 B2* | 6/2015 | Visenzi | B62J 9/23 |
| 9,604,685 B2* | 3/2017 | Schanz | B62J 7/04 |
| 9,821,869 B2* | 11/2017 | Armstrong | B60R 9/02 |
| 10,696,342 B2* | 6/2020 | Sievers-Paulsen | A45C 7/0045 |
| 2005/0104380 A1 | 5/2005 | Cho | |
| 2010/0108729 A1 | 5/2010 | Golub et al. | |
| 2019/0023340 A1 | 1/2019 | Sievers-Paulsen et al. | |

FOREIGN PATENT DOCUMENTS

| | | |
|---|---|---|
| CN | 201176208 Y | 1/2009 |
| CN | 101939211 A | 1/2011 |
| CN | 102803057 A | 11/2012 |
| CN | 103153768 A | 6/2013 |
| CN | 106660597 A | 5/2017 |
| CN | 107107981 A | 8/2017 |
| CN | 107636856 A | 1/2018 |
| CN | 108366656 A | 8/2018 |
| DE | 10014291 A1 | 9/2001 |
| EP | 1921001 A1 | 5/2008 |
| FR | 2893583 A3 | 5/2007 |
| JP | 2002127966 A | 5/2002 |
| JP | 2010047164 A | 3/2010 |
| TW | M290130 U | 5/2006 |
| TW | M306966 U | 3/2007 |
| WO | 9708044 A1 | 3/1997 |
| WO | 2007045371 A1 | 4/2007 |
| WO | 2011098897 A1 | 8/2011 |

OTHER PUBLICATIONS

International Search Report issued Mar. 11, 2020 re: Application No. PCT/IB2020/051009, pp. 1-4, citing: WO 2007/045371 A1, WO 2011/098897 A1, EP 1 921 001 A1 and US 2005/104380 A1.
Written Opinion issued Mar. 11, 2020 re: Application No. PCT/IB2020/051009, pp. 1-6, citing: WO 2007/045371 A1, WO 2011/098897 A1, EP 1 921 001 A1 and US 2005/104380 A1.

* cited by examiner

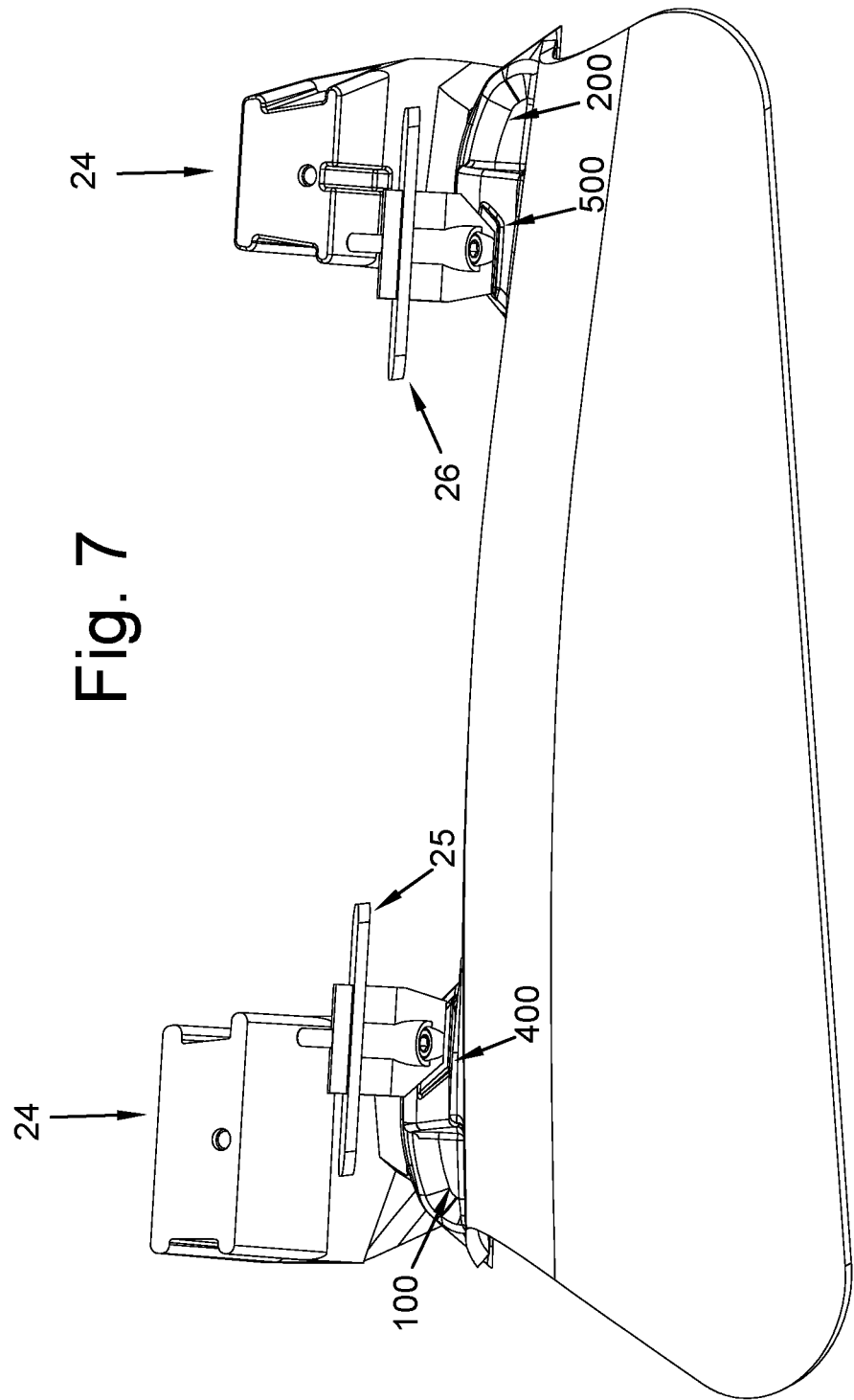

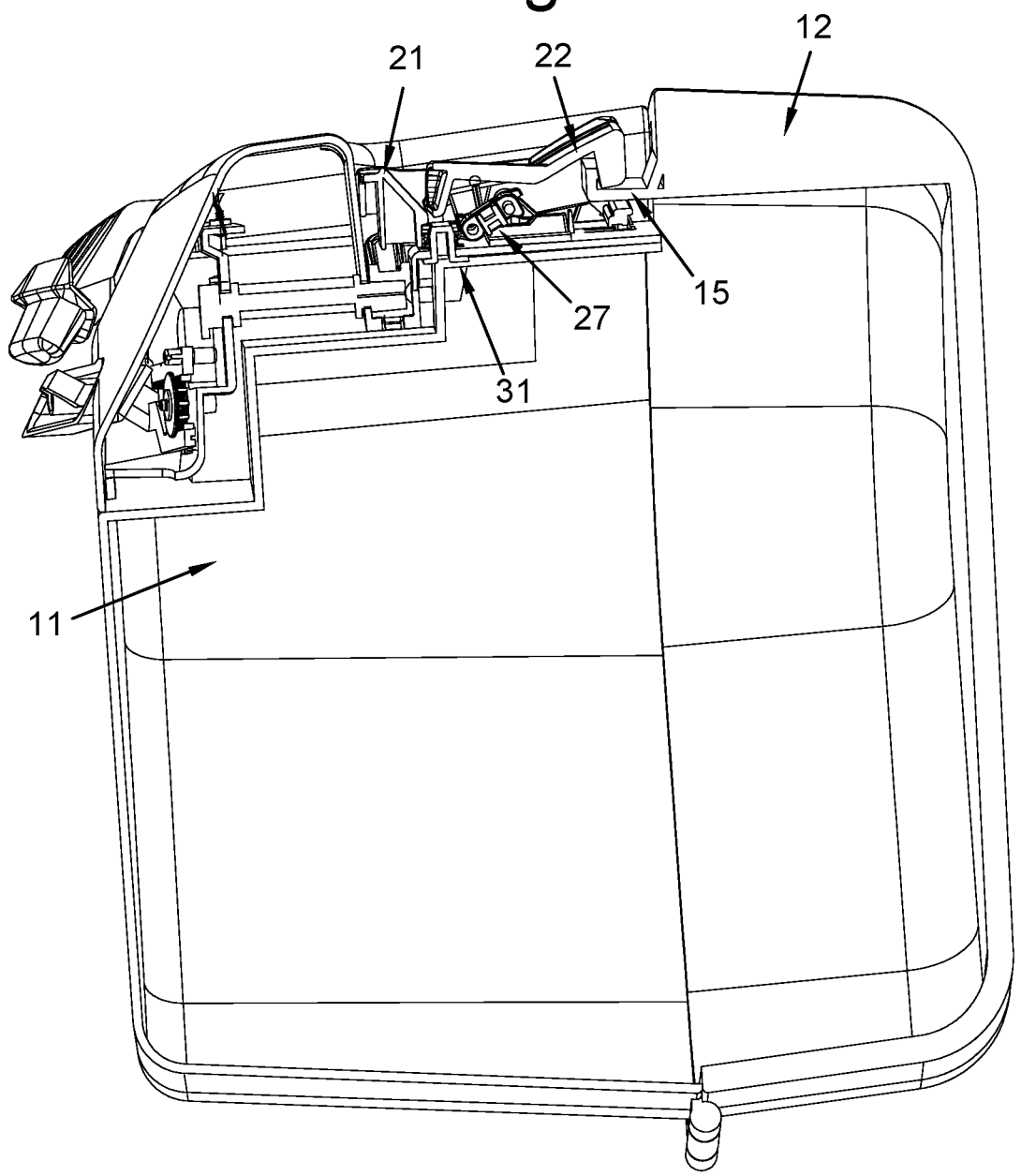

LATERAL CASE FOR MOTORCYCLES WITH IMPROVED COUPLING DEVICE TO THE VEHICLE FRAME

TECHNICAL FIELD

The present disclosure relates to a lateral case or bag for motorcycles comprising an improved coupling device for the coupling and release of the case itself to/from the vehicle frame.

More in particular, the present disclosure relates to a lateral case for motorcycles appropriately configured to allow the user to perform the coupling and release operations with a single and simple vertical movement of the bag with respect to the motorcycle frame, so that the coupling/release operation is simpler and more convenient for the user.

The present disclosure further relates to a lateral case for motorcycles provided with an improved coupling/release and locking/unlocking system that can be easily activated by the user and having a high degree of security against accidental or fraudulent openings.

BACKGROUND

The use of lateral bags or cases adapted to house luggage, helmets or other accessories is known in the motor vehicle sector, which can be coupled and released to/from the motorcycle frame, in particular at the rear area of the vehicle frame.

Even more in particular with specific reference to lateral cases or bags for motorcycles, lateral cases are known in the sector which in order to be coupled to the motorcycle frame oblige the user to perform a horizontal or oblique translation movement of the bag with respect to the vehicle frame during the coupling/release operations.

The fact that the user has to couple the bag to the frame and then move the bag with respect to the frame with a horizontal or oblique movement is perceived by the user as inconvenient, particularly uncomfortable when the bag to be coupled is full and therefore heavy, and in any case complicated to the point of making the correct outcome of the coupling/release operations uncertain.

Likewise, such movement is perceived as inconvenient in the case of the operation of releasing the bag.

According to the state of the art, once the bag is coupled to the frame by means of appropriate coupling/release means, such coupling/release means must also be locked in a stable coupled bag position.

In the same way, to allow the release of the bag the coupling/release means must be unlocked in advance passing into a configuration in which the bag can be released from the frame.

Known embodiments do not offer simple and at the same time reliable solutions for the coupling/release and locking/unlocking of the bag to/from the vehicle frame, and also generally require that an actual support frame be present on the motorcycle, generally made of metal tubular material, for the coupling and support of the bag.

SUMMARY

The aim of the present disclosure is therefore that of providing a lateral case or bag for motorcycles comprising a coupling device of the improved type for the coupling and release of the case itself to/from the vehicle frame which allows the user, in the coupling operations, to perform a simple vertical movement of the bag with respect to the frame, so as to "hang" the bag itself on the support frame. A similar concept applies to the release operations.

Within this aim, the present disclosure provides a lateral case for motorcycles comprising a coupling/release device the activation of which is easy and intuitive for the user and, at the same time, strong, secure and reliable.

Again, the present disclosure provides a lateral case for motorcycles comprising a coupling/release device that allows the bag to be directly coupled to the motorcycle frame regardless of the presence of a support frame or however a dedicated tubular support structure.

These advantages are achieved by providing a lateral case for motorcycles comprising a coupling device of the improved type, according to what is set out in claim 1.

BRIEF DESCRIPTION OF THE DRAWINGS

The characteristics and advantages of the lateral case according to the present disclosure will become more apparent from the following detailed description, provided by way of non-limiting example, with reference to the schematic attached drawings, wherein:

FIG. 7 shows the same view from below as FIG. 6 wherein the hooks of the case are inserted into the housing seats provided in the frame and the sliders are in the locked position, i.e. they are distanced from one another at the outer stroke end position wherein said sliders are engaged at corresponding abutment grooves provided on said frame below the hook housing seats, a position that does not allow the release of the case from the frame; and FIGS. 8A and 8B each show a partial sectional view of the case closing means, in a closed case hook closing condition, and an open case hook closing condition, respectively.

DETAILED DESCRIPTION OF THE DRAWINGS

Figure 1:
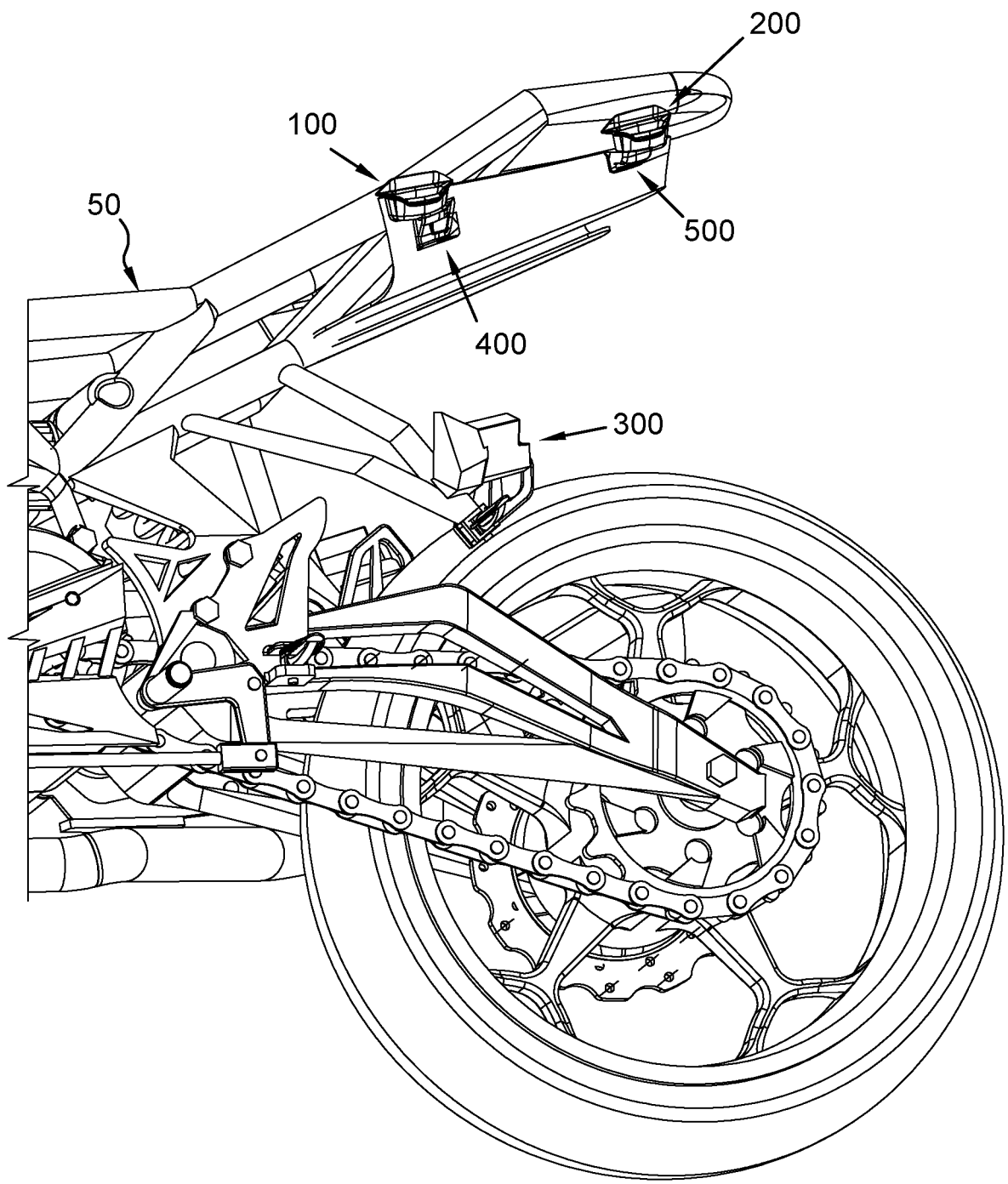
FIG. 1 shows a side view of the rear area of a motorcycle on whose frame seats are provided for housing the coupling/release device of the lateral bag according to the present disclosure.
Figure 2:
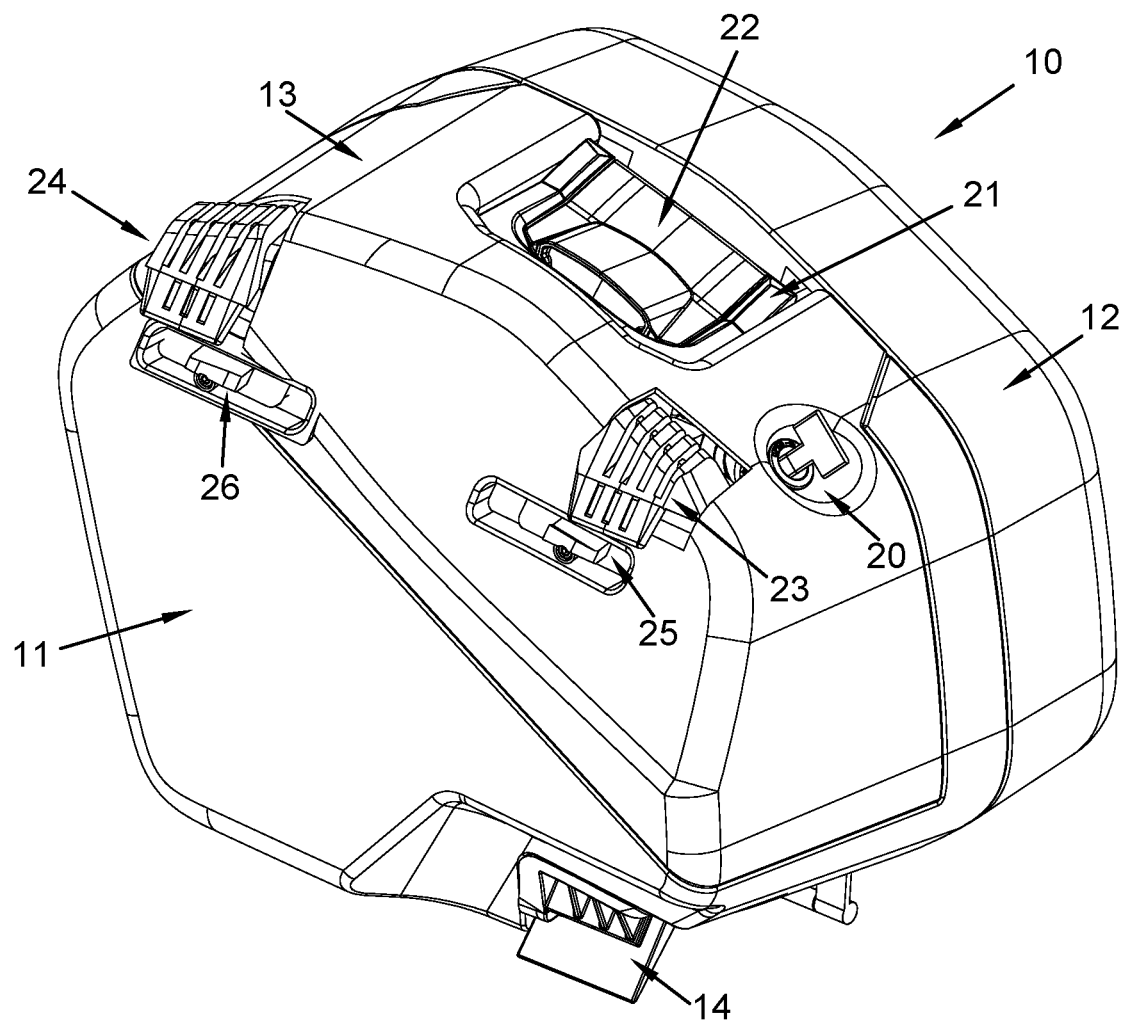
FIG. 2 shows an overall perspective view of the lateral case according to the present disclosure.

In the appended figures overall views and views of details of the lateral case 10 for motorcycles according to the present disclosure, and of the related coupling/release device of the case 10 to/from the frame 50 of a vehicle are shown.

As it will become clearer from the detailed description provided below by way of example, the case 10 according to the present disclosure allows the lateral case 10 to be directly hooked to the frame 50 of the vehicle with the provision of relevant hooks 23, 24 on the case 10 and corresponding coupling seats 100, 200 directly on the frame.

Advantageously said coupling seats 100, 200 are provided in an area of the frame that is accessible from above, so that the bag 10 can be coupled to the frame 50 with a substantially vertical movement by the user.

More advantageously, to protect the aesthetics of the back end of the motorcycle, the coupling seats 100, 200 shall be provided in a position that is accessible from above for the insertion of said hooks 23, 24 of the case, preferably on the side of the vehicle below the seat and/or the rear luggage compartment, so as not to ruin the aesthetics of the vehicle.

Therefore, the subject matter of the present disclosure is not only the case 10 provided with the coupling/release device that will be better described herein below, but also the coupling system comprising the frame 50 appropriately provided to cooperate with the coupling/release device of the case 10.

As mentioned, the hooks 23, 24, of which there are preferably two, are inserted into the coupling seats 100, 200 provided on the frame 50, so that the case 10 hangs from the frame of the vehicle.

In order to lock the movements of the case also in a transverse direction with respect to the longitudinal axis of the vehicle, the case 10 according to the present disclosure is advantageously provided with a housing seat 14 obtained at the lower area of the case and configured to accommodate, when the case is coupled to the motorcycle, lower coupling means 300 integral with the vehicle frame 50 and preferably at the area of the frame supporting the passenger footrest.

Thanks to this configuration of the coupling system on the vehicle, metal frames are not provided for the fixing of the bag and therefore, once the case has been removed, the aesthetic line of the motorcycle is unaltered as required by users.

Advantageously, the case 10 according to the present disclosure comprises two shells hinged to one another, the bottom 11 and the cover 12, and a coupling/release device that is housed within the case itself, preferably fixed to the bottom 11.

Preferably, the case 10 according to the present disclosure comprises only one lock 20 that can be activated by the user. Such lock advantageously controls both the opening and the closing of the case and the possibility to couple and release it to/from the motorcycle.

Now, passing onto the detailed description of the lateral case 10 according to the present disclosure, it comprises, as mentioned, preferably at least one pair of hooks 23, 24 which project from the surface of the case 10 intended to face towards said frame 50, and whose loops 23a, 24a face downwards, and which are configured to engage special coupling seats 100, 200 obtained on the frame 50 of the vehicle.

Said hooks 23, 24 are part of the coupling/release device of the case 10 according to the present disclosure, which device further comprises a pair of sliders 25, 26 movable along a substantially horizontal direction and each configured to be selectively positioned in correspondence with one of said hooks 23, 24, below it, so as to match special grooves 400, 500 formed on the frame 50 below said coupling seats 100, 200.

The presence of the movable sliders 25, 26, as can be seen better below, allows the movements in the vertical direction of the case 10 to be blocked once it is coupled to the frame 50 thus preventing the hooks 23, 24 from coming out of the coupling seats 100, 200.

In fact, the movable sliders 25, 26 are configured to be selectively engaged with the respective grooves 400, 500 obtained on the frame below the coupling seats 100, 200 so that when the sliders 25, 26 are engaged within said grooves, the lifting of the case with respect to the frame and therefore the removal of the bag from the vehicle is actually prevented.

The movement of said movable sliders 25, 26 is performed by the user through said coupling/release device, which for the purpose comprises a pair of sliding rod-shaped elements 43, 46, each of which in turn comprises at least one rack portion 44, 47.

A first 43 of said rod-shaped elements is in turn kinematically connected to a locking/unlocking lever 41 which can be activated by the user.

Figure 3:
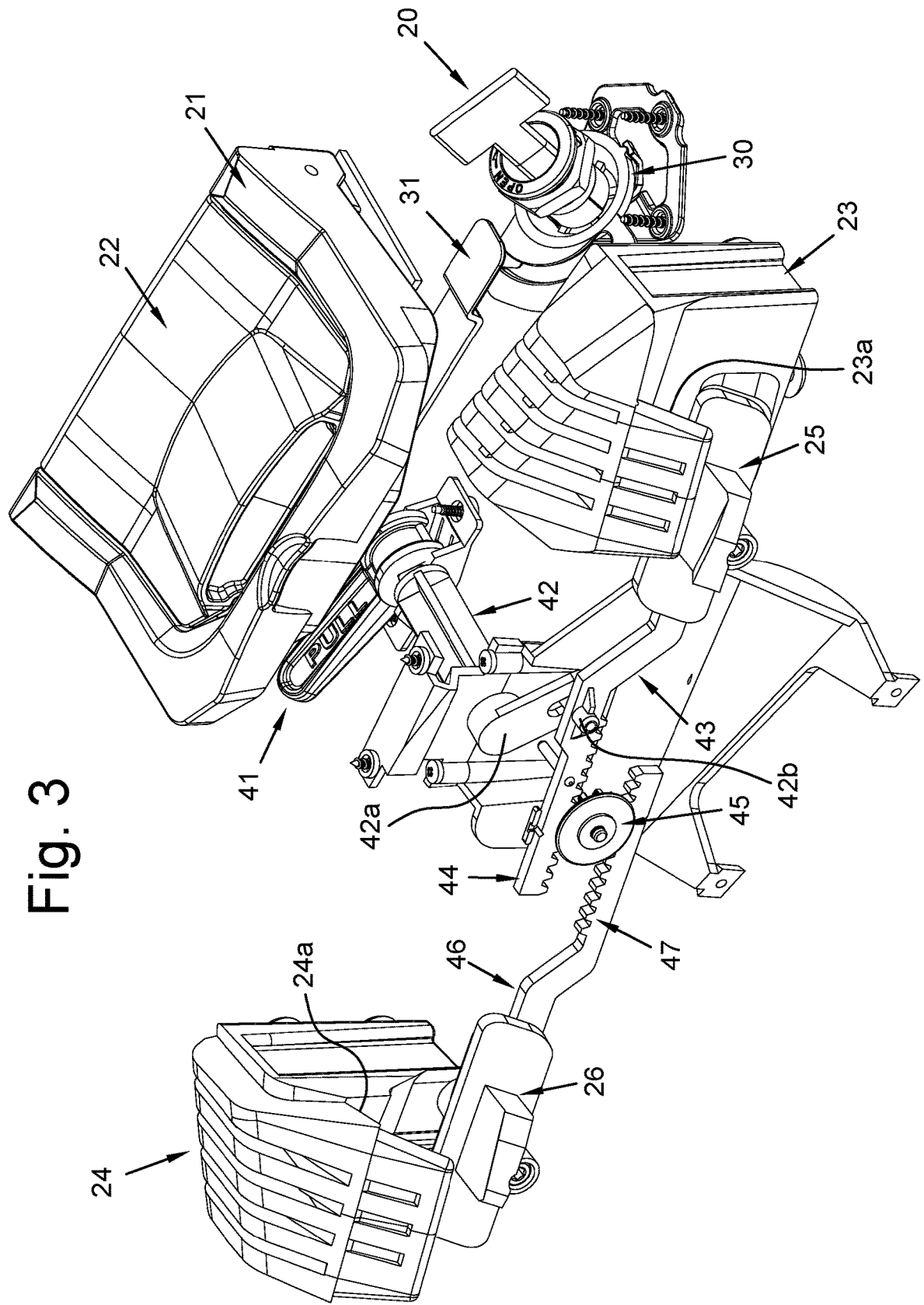
FIG. 3 shows a detailed view of the main components of the coupling/release device that equips the lateral case according to the present disclosure, in a closed device configuration and therefore with the bag firmly coupled to the vehicle frame.
Figure 4:
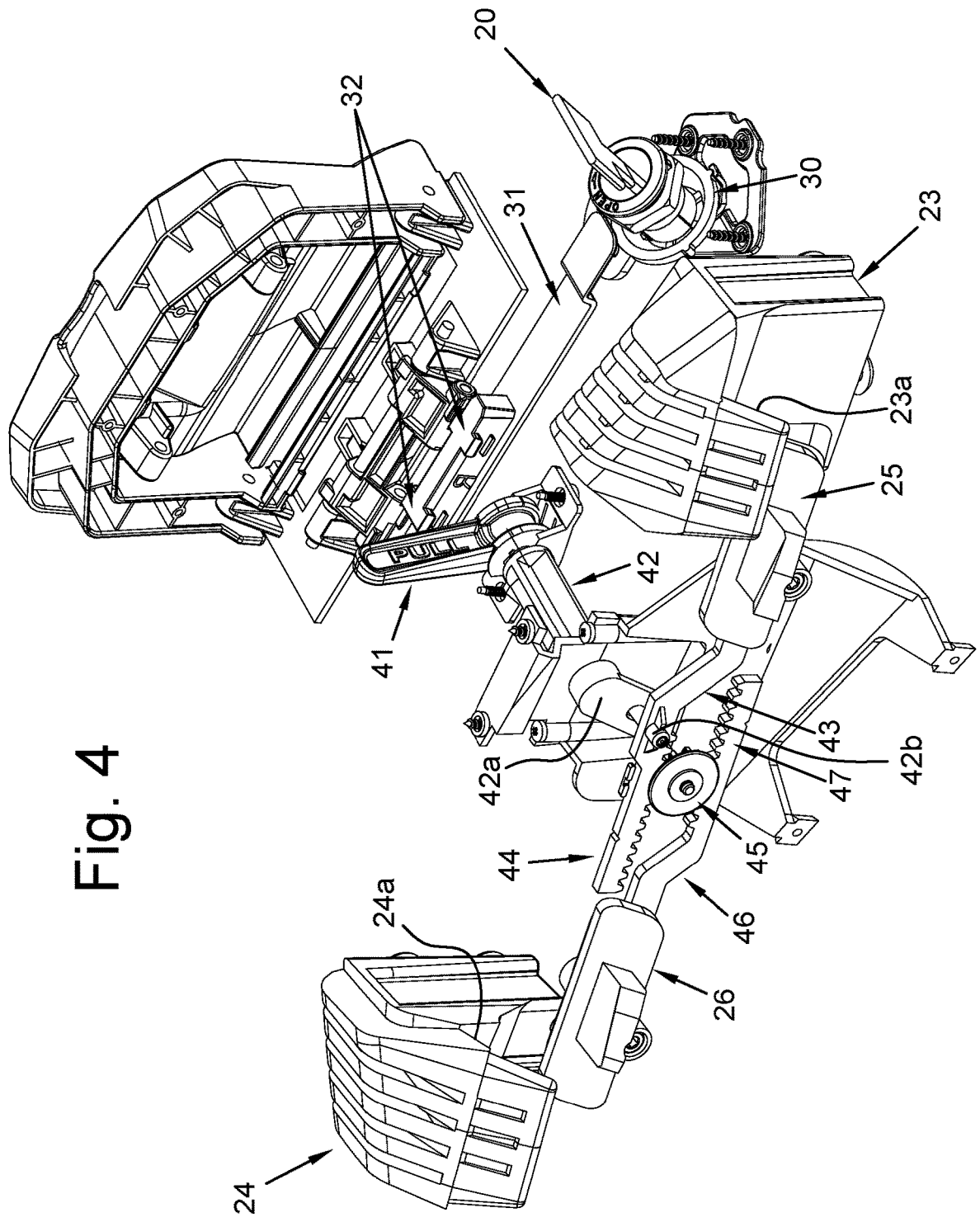
FIG. 4 shows the same view as FIG. 3 in an open device configuration and therefore with the case that can be released from the vehicle frame.
Figure 5:
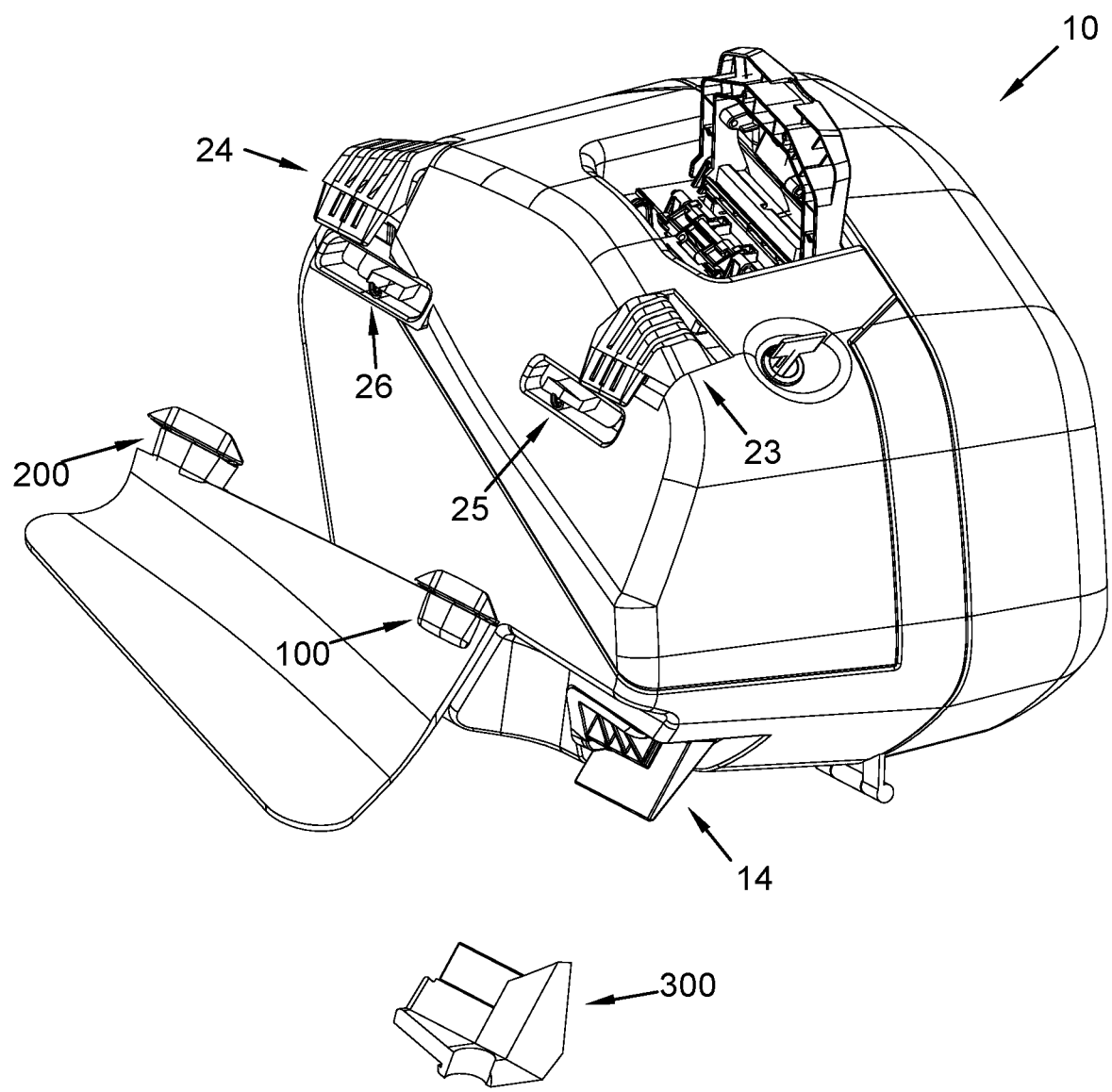
FIG. 5 shows a schematic perspective view of a step of coupling the lateral case to the motorcycle frame.
Figure 6:
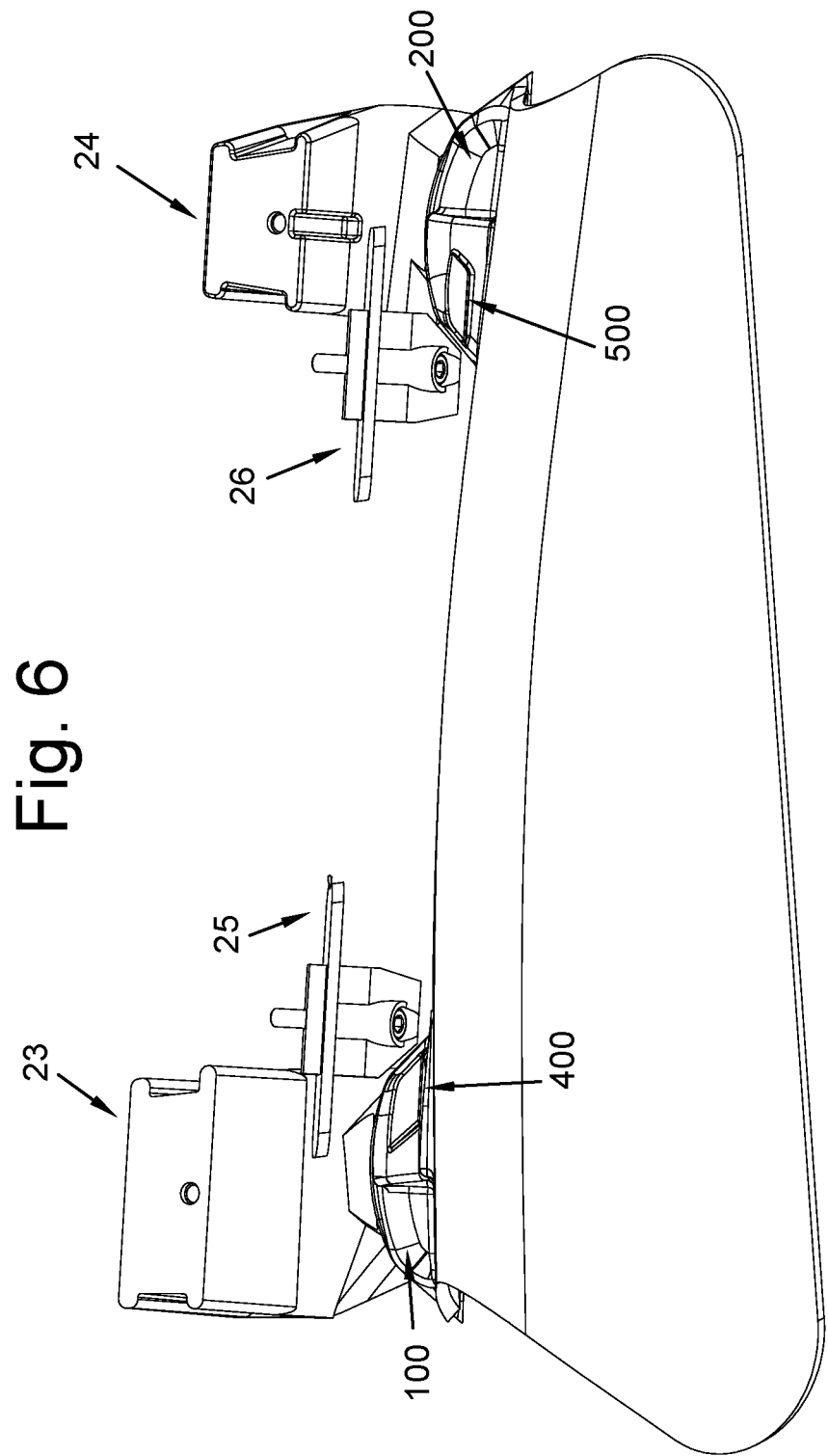
FIG. 6 shows a view from below of the coupled condition of the case to the vehicle wherein the hooks of the case are inserted into the housing seats provided in the frame and the sliders are in the released position, i.e. they are close to one another at the inner stroke end position which allows the coupling and release of the case from the frame.

With particular reference to the appended FIGS. 3 and 4, the activation of said locking/unlocking lever 41 causes the translation of said first rod-shaped element 43 and of the relative slider 25.

Advantageously, the two rack portions 44, 47 of the two rod-shaped elements 43, 46 result facing each other so that an idle toothed wheel 45, free to turn about its own central axis, can be interposed between them so as to transfer the translational motion of the first rod-shaped element 43 to the second rod-shaped element 46.

In this way the translation of the first rod-shaped element 43 caused by the activation of the locking/unlocking lever 41 causes an equal translation in the opposite direction of the second 46 of said rod-shaped elements and, therefore, of the relative slider 26.

The sliders 25, 26 are therefore movable between a first released position in which the coupling and release of the case 10 to/from the frame 50 of the vehicle is possible, and a second locked position in which they abut the relevant grooves 400, 500 made below said fame 50 thus retaining the case coupled to the frame itself.

According to the preferred embodiment of the present disclosure illustrated herein by way of non-limiting example, the locking/unlocking lever 41 is movable between a first closed position in which said sliders 25, 26 are in the locked position, and a second opening position in which said sliders 25, 26 are in said unlocked position.

For example, in the first unlocked position, said sliders 25, 26 will be close to one another, so as to allow the coupling and release of the case 10 to/from the frame 50 of the vehicle, whereas in the second unlocked position said sliders 25, 26 are spaced out from one another and inserted inside said grooves 400, 500 obtained on the frame keeping the case coupled to the frame 50 itself.

To move said sliders 25, 26, the locking/unlocking lever 41 is advantageously assembled on a rotating shaft 42 in turn connected to a crank 42a which engages, preferably through a pin 42b, with said first rod-shaped element 43. As mentioned, and with particular reference to the detail of FIGS. 3 and 4, the user by activating in rotation the locking/unlocking lever 41 about the axis of the rotating shaft 42 moves in translation the first rod-shaped element 43 and, thanks to the presence of the idle toothed wheel 45, free to rotate about its own axis, a single and opposite translation of said second rod-shaped element 46.

By rotating the locking/unlocking lever 41 in one direction, the mutual nearing of the two sliders 25, 26 will be obtained; by rotating said locking/unlocking lever 41 in the opposite direction the mutual distancing of the two sliders 25, 26 will be obtained.

In order to guarantee the security of the coupling of the case to the vehicle and prevent accidental or fraudulent activations of the locking/unlocking lever 41, advantageously, according to the preferred embodiment of the present disclosure shown in the appended figures, the case 10 further comprises closing means 21, 30, 31 of the case configured for selectively allowing or preventing the user from accessing said locking/unlocking lever 41.

More in particular, said closing means 21, 30, 31 of the case 10 are operatively connected to a lock block 20 advantageously provided on the case itself, so that by acting on the lock 20 it is possible to lock or unlock the closing means 21, 30, 31 of the case, preventing or allowing the user to access to said locking/unlocking lever 41.

Even more in detail, said closing means 21, 30, 31 of the case preferably comprise an under-lock element 30 operatively connected to said lock block 20, a locking slider 31 operatively connected to said under-lock element 30, and a handle 21 configured to selectively cooperate with said locking slider 31 so that operating said lock block 20 through said under-lock element 30 and said locking slider 31 the opening of said handle 21 is selectively allowed or prevented, which in turn allows or prevents the access to said locking/unlocking lever 41.

Furthermore, the closing means of the case will also comprise, on said bottom 11, a case closure hook 22 which allows the case to be closed and/or opened according to the prior art.

Figure 8B:
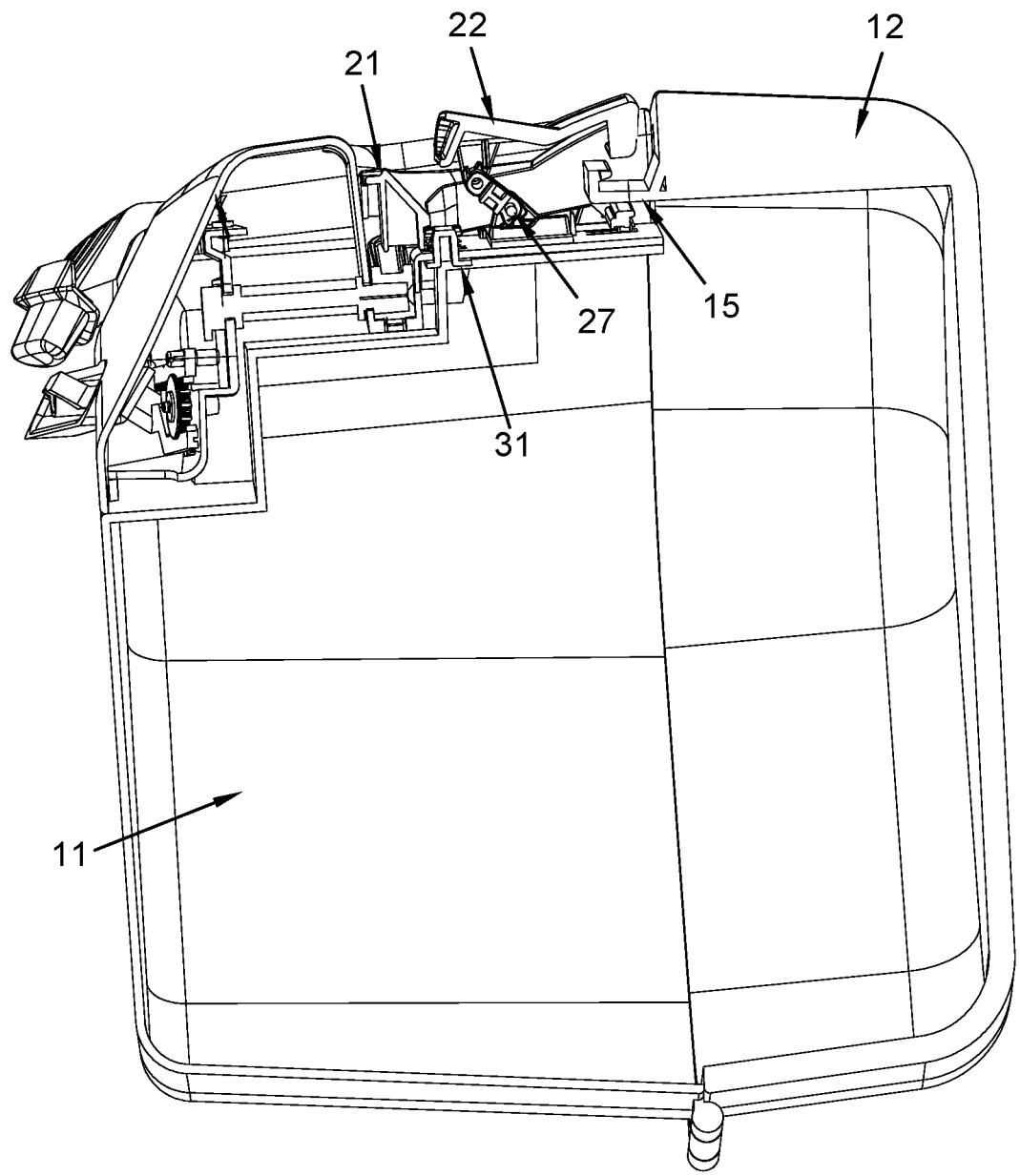

More specifically, and with particular reference to FIGS. 8A and 8B, the means that allow the opening and closing of the case advantageously comprise a hooking tooth 15 provided on the cover 12, and the case closure hook 22, which is in a known way coupled to a rod 27 that allows the movement thereof with respect to the cover 12.

When the case is closed the case closure hook 22 is engaged with the tooth 15 of the cover.

When the lock 20 is closed, it is not possible to make the case closure hook 22 rotate since the rod 27, which is directly connected to the case closure hook 22, is locked by the action of the locking slider 31.

Therefore the case cannot be opened.

When the lock 20 is open, the rod 27 is disengaged from the action of the locking slider 31 and the movement of the case closure hook 22 is therefore allowed, the coupling between the case closure hook 22 and the cover tooth 15 is disengaged and therefore the case is opened.

The locking of the case closure hook 22 is operated by the presence on said locking slider 31 of locking teeth 32 that find corresponding abutments on said case closure hook 22 and on the handle 21.

Thanks to this configuration, and as it can be seen in the drawings, on the case according to the present disclosure there is only one lock both for opening and closing the case itself, through the movement of said case closure hook 22, and to allow the coupling/release thereof to/from the motorcycle, allowing the lifting of the handle 21 in order to be able to access the lever 41 and be able to activate it.

When the key is in the closing position, the user cannot move either the handle 21 or the case closure hook 22 and therefore it is not possible either to open the case or couple/release it to/from the motorcycle.

By rotating the key in the opening position the disengagement of the teeth 32 of the slidable slider 31 from those of the handle 21 and from those of the case closure hook 22 is obtained.

Once the lock 20 is open, the handle 21 and the case closure hook 22 can be moved by the user independently from one another.

In other words, when the key is in the opening position the user can selectively decide whether to open the case, by acting on the case closure hook 22, or to couple/release the case to/from the motorcycle by lifting the handle 21 and acting on the lever 41 as described.

Advantageously, as shown in the appended figures, the preferred embodiment of the present disclosure provides that the locking/unlocking lever 41 is placed below said handle 21.

With the handle 21 closed, the locking/unlocking lever 41 is in the closing, horizontal, position and the sliders 25, 26 are positioned at the outer stroke end position of the grooves 400, 500 obtained on said frame 50 below the hooks 23, 24.

In this configuration it is not possible to couple the case to the motorcycle as the position of the coupling sliders 25, 26 does not allow the vertical insertion of the hooks 23, 24 in the relevant coupling seats 100, 200 obtained on the frame 50.

To couple the case to the motorcycle it is necessary to lift the handle 21 and therefore rotate the lever 41 in the vertical position; in this way the system of kinematic mechanisms described above makes the coupling sliders 25, 26 move towards the inside bringing them to their stroke end outside the profile of the hooks 23, 24.

In this way it is possible to insert from above the hooks 23, 24 into the relevant coupling seats 100, 200 obtained on the side of the frame 50, and at the same time it is also possible to couple the housing seat 14 obtained at the lower region of the case with the lower coupling means 300 provided on the vehicle frame, preferably at the connection to the passenger footrest.

By bringing the lever 41 into the horizontal position, the coupling sliders 25, 26 are moved again up to the outer stroke end, engaging them in said grooves 400, 500 obtained below the coupling seats 100, 200 of the hooks 23, 24.

In this configuration it is no longer possible to remove the case as the locking sliders interfere directly with the motorcycle side in which the grooves 400, 500 are obtained and do not allow the vertical movement of the case and therefore the disengagement of the hooks 23, 24 from their seats 100, 200.

To make the system secure it is therefore necessary to close the handle 21 again and bring the key back into the closing position.

The repositioning of the handle 21 in the closed position also signals to the user that the case is correctly coupled to the motorcycle. In fact, if the coupling is not completed correctly, the lever 41 will not be in the horizontal position and will not allow the closing of the handle 21 and, therefore, the complete rotation of the key of the lock 20.

To detach the case from the motorcycle it is necessary to perform the same procedure and therefore to bring the key of the lock 20 into the opening position, lift the handle 21, rotate the lever 41 thus causing the movement of the coupling sliders 25, 26 until such sliders are engaged on the inner stroke end and therefore the sliders are disengaged from said grooves 400, 500 and the hooks 23, 24 from their seats 100, 200 lifting the case upwards.

From the description provided, the characteristics of the lateral case for motorcycles comprising the coupling/release device for allowing the coupling and release of the case 10 itself to/from the frame 50 of the vehicle according to the present disclosure are clear.

The advantages of the coupling system for the coupling of such case to the frame of a motorcycle are also clear, where said frame is appropriately configured to allow the operation of the specific coupling/release device.

It is further to be understood that the coupling/release device of the lateral case for motorcycles according to the present disclosure is susceptible to modifications and variants, all falling within the scope of protection identified by the appended claims, which form an integral part of the descriptive text.

Furthermore, the details provided by way of example can be replaced by technically equivalent elements falling within the scope of protection of the disclosure.

The invention claimed is:

1. A lateral case for motorcycles comprising a coupling/release device configured to allow the coupling and the release of said case to/from a vehicle frame, said coupling/release device comprising at least one pair of hooks which protrude from the surface of the case intended to face said frame with loops facing downwards and configured to engage special coupling seats formed on said vehicle frame, said device further comprising a pair of sliders movable along a substantially horizontal direction and each configured to be able to selectively positioning in correspondence with one of said hooks, below it, so as to match special grooves formed on said frame below said coupling seats, further wherein each of said sliders is connected to a respective sliding rod-shaped element, comprising at least one rack portion, a first of said sliding rod-shaped elements being in turn kinematically connected to a locking/unlocking lever which can be activated by the user, the actuation of said lever causing the translation of said first rod-shaped element and of the relative slider, the two rack portions resulting facing each other and an idle toothed wheel being interposed between them so that the translation of said first rod-shaped element caused by the actuation of said lever causes an equal translation in the opposite direction of the second of said rod-shaped elements, and of the relative slider.

2. The lateral case for motorcycles according to claim 1, wherein said sliders are movable between a first release position wherein said sliders are close to each other and allow the coupling and uncoupling of the case to the frame of the vehicle, and a second locking position wherein said sliders are spaced from each other and match said grooves formed on said frame retaining the case hooked to the frame of the vehicle with said hooks inserted into said coupling seats.

3. The lateral case for motorcycles according to claim 2, wherein said locking/unlocking lever is movable between a first closing position wherein said sliders are in said locking position, and a second opening position wherein said sliders are in said release position.

4. The lateral case for motorcycles according to claim 3, wherein said locking/unlocking lever is assembled on a rotating shaft in turn connected to a crank configured to engage through a pin with said first rod-shaped element, so that the rotation of said locking/unlocking lever around the axis of the rotating shaft causes a translation of said first rod-shaped element and, consequently, an equal and opposite translation of said second rod-shaped element.

5. The lateral case for motorcycles according to claim 1, wherein said case further comprises closing means of the case configured for selectively allowing or preventing the user from accessing said locking/unlocking lever.

6. The lateral case for motorcycles according to claim 5, wherein said case further comprises a lock block and in that said case closing means are operatively connected to said lock block so that by acting on the lock is possible to lock or unlock said case closing means preventing or allowing the user to access said locking/unlocking lever.

7. The lateral case for motorcycles according to claim 6, wherein said case closing means comprise an under-lock element operatively connected to said lock block, a locking slider operatively connected to said under-lock element, and a handle configured to selectively cooperate with said locking slider so that by operating said lock block through said under-lock element and said locking slider the opening of said handle is selectively allowed or prevented, said handle in turn allowing or preventing the access to said locking/unlocking lever.

8. The lateral case for motorcycles according to claim 7, wherein said case closure means further comprise a case closure hook which allows to close and/or open the case, operatively connected through said under-lock element and said locking slider to said lock block so that when the key is in the open position both said suitcase closure hook and said handle can be moved by the user, so as to allow the access to said lever.

9. The lateral case for motorcycles according to claim 1, wherein said case further comprises a housing seat obtained at the lower area of the case and configured to receive, when the case is coupled to the motorcycle, lower coupling means integral with the vehicle frame.

10. A coupling system for a lateral case for motorcycles, comprising a case according to claim 1, a motorcycle frame equipped, in the area of the back end of the vehicle, with coupling seats configured to accommodate said hooks of said case facing upwards, said frame being further provided with grooves formed at the bottom to said coupling seats and configured to match with said sliders preventing, when said sliders are in their locking position wherein said sliders are spaced apart, movements in the vertical direction of the case with respect to the frame and, consequently, the exit of the hooks from the corresponding coupling seats.

* * * * *